US008993026B2

(12) United States Patent
Molnar et al.

(10) Patent No.: US 8,993,026 B2
(45) Date of Patent: Mar. 31, 2015

(54) INFRARED PORTABLE BROILER

(71) Applicant: SCI Direct, LLC, North Canton, OH (US)

(72) Inventors: Jon P. Molnar, Massillon, OH (US); Neil R. Tyburk, Canton, OH (US)

(73) Assignee: SCI Direct, LLC, North Canton, OH (US)

( * ) Notice: Subject to any disclaimer, the term of this patent is extended or adjusted under 35 U.S.C. 154(b) by 0 days.

(21) Appl. No.: 13/887,591

(22) Filed: May 6, 2013

(65) Prior Publication Data
US 2014/0328990 A1    Nov. 6, 2014

(51) Int. Cl.
*A47J 37/07* (2006.01)
*A47J 37/06* (2006.01)
*A23L 1/01* (2006.01)
*A47J 36/24* (2006.01)

(52) U.S. Cl.
CPC ........... *A47J 37/0688* (2013.01); *A23L 1/0128* (2013.01); *A47J 37/0682* (2013.01); *A47J 37/0652* (2013.01); *A47J 36/24* (2013.01)
USPC ................. 426/523; 99/393; 99/401; 99/447; 99/448; 99/450

(58) Field of Classification Search
CPC ... A47J 36/24; A47J 36/2494; A47J 37/0623; A47J 37/0647–37/0652; A47J 37/0682
USPC ............ 426/523, 520; 99/339, 340, 393, 401, 99/447, 448, 450
See application file for complete search history.

(56) References Cited

U.S. PATENT DOCUMENTS

| | | | | | |
|---|---|---|---|---|---|
| 1,903,477 | A | * | 4/1933 | Rolfson | 219/392 |
| 2,980,101 | A | * | 4/1961 | Anetsberger et al. | 126/41 R |
| 3,103,160 | A | * | 9/1963 | Forniti et al. | 99/339 |
| 3,277,813 | A | * | 10/1966 | Luscher | 99/391 |
| 3,332,339 | A | * | 7/1967 | Helgeson et al. | 99/339 |
| 3,681,096 | A | * | 8/1972 | Philipe | 99/339 |
| 3,895,622 | A | * | 7/1975 | Krueger | 126/38 |
| 3,947,657 | A | * | 3/1976 | Ershler | 219/450.1 |
| 4,144,870 | A | * | 3/1979 | Reynolds | 126/41 E |
| 4,700,618 | A | * | 10/1987 | Cox, Jr. | 99/339 |
| 5,000,083 | A | * | 3/1991 | Pickave | 99/327 |
| 5,708,255 | A | * | 1/1998 | Lamanna et al. | 219/396 |
| 6,038,965 | A | * | 3/2000 | Thorndyke | 99/340 |
| 6,223,739 | B1 | * | 5/2001 | Pai | 126/41 R |
| 6,363,836 | B1 | * | 4/2002 | Usherovich | 99/339 |
| 7,117,866 | B2 | * | 10/2006 | Cantal | 126/41 R |
| 8,669,500 | B2 | * | 3/2014 | Hensel et al. | 219/483 |
| 2004/0173199 | A1 | * | 9/2004 | Cantal | 126/41 R |
| 2005/0255208 | A1 | * | 11/2005 | Shei | 426/523 |
| 2007/0119445 | A1 | * | 5/2007 | Wen | 126/25 AA |

* cited by examiner

*Primary Examiner* — Drew Becker
(74) *Attorney, Agent, or Firm* — Buckingham, Doolittle & Burroughs, LLC

(57) ABSTRACT

The present invention relates to an infrared-style broiler sized to be portable, safe, and occupy minimal space, while still providing surface area for use in warming foods. The warming surface may be heated from below by way of radiant heat and/or may be heated by way of venting hot air from the inside of the broiler to the warming surface by way of vents.

3 Claims, 9 Drawing Sheets

INFRARED PORTABLE BROILER

BACKGROUND OF THE INVENTION

1. Technical Field

The present invention relates to an infrared portable broiler. More particularly, the present invention relates to a portable device for cooking food items from above to allow the food to drip away from the heating element. Specifically, the present invention relates to an infrared-style broiler sized to be portable, safe, and occupy minimal space, while still providing surface area for use in warming foods.

2. Background Information

Heretofore, there have existed broilers or ovens for which to heat food items. Similarly, there have existed portable grills for use in camping or tailgating activities. These portable food-heating devices are of a grill-type of structure where the heating element is underneath the items to be cooked. Some of these are supplied by electrical means and some by natural gas. However, inasmuch as the heating element is placed below the item to be cooked, the food tends to drip down onto the flame or heating element which generates an immediate scorching flame which jumps up towards the food for a fraction of a second. This is not only a dangerous situation from a safety standpoint, the food itself tends to be seared or burned unevenly resulting in uneven blackened portions of the food.

In addition to the above, the existing portable grills use a direct flame to heat the food and are either permanently open to the elements, or have a lid which releases a majority of the heat when opened. This provides a huge variance in the temperature output and overall cooking experience. Further still, the existing portable grills provide an overall heating footprint which is entirely occupied by the gridiron or grilling surface. Existing grills occupy an entire table or truck tail gate, with no room for other foods or tailgating items. If one wishes to keep a pan of beans or chili warm, yet not directly over a flame, one is required to occupying a large portion of the grilling surface with the pan and extinguish the flame, or to place the item entirely away from the grill.

Therefore, a need exists in the art to provide a portable style food preparation and heating unit which prevents or neutralizes the problem of the food dripping onto the heating element. The need also exists for cooking food via an alternative to a direct flame. Further, the need also exists to provide additional surface area for use in warming food without occupying the primary grilling area.

SUMMARY

In one aspect, the invention may provide a portable broiler comprising: a housing, a cooking chamber defined by the housing, a grilling surface disposed in the cooking chamber, and a heating unit disposed above the grilling surface and selectively operable in one of a broiling state and a non-broiling state, whereby the heating unit heats the grilling surface when the heating unit is in the broiling state.

In another aspect, the invention may provide a portable broiler comprising: a housing, a warming surface disposed on the housing, a grilling surface removably disposed in the housing, and a heating unit disposed in the housing and operable to simultaneously heat the grilling surface and the warming surface, whereby the heating unit disposed between the warming surface and the grilling surface.

In another aspect, the invention may provide a method for cooking an item of food on a grilling surface, the method comprising the steps of: positioning a heating unit above the grilling surface, positioning a warming surface above the heating unit, directing an amount of heat downwardly from the heating unit towards the grilling surface, and heating the warming surface from below via radiant heat from the amount of heat.

BRIEF DESCRIPTION OF THE SEVERAL VIEWS OF THE DRAWINGS

Preferred embodiments of the invention, illustrated of the best mode in which Applicant contemplates applying the principles, are set forth in the following description and are shown in the drawings and are particularly and distinctly pointed out and set forth in the appended claims.

Similar numbers refer to similar parts throughout the drawings.

DETAILED DESCRIPTION OF THE INVENTION

Figure 1:
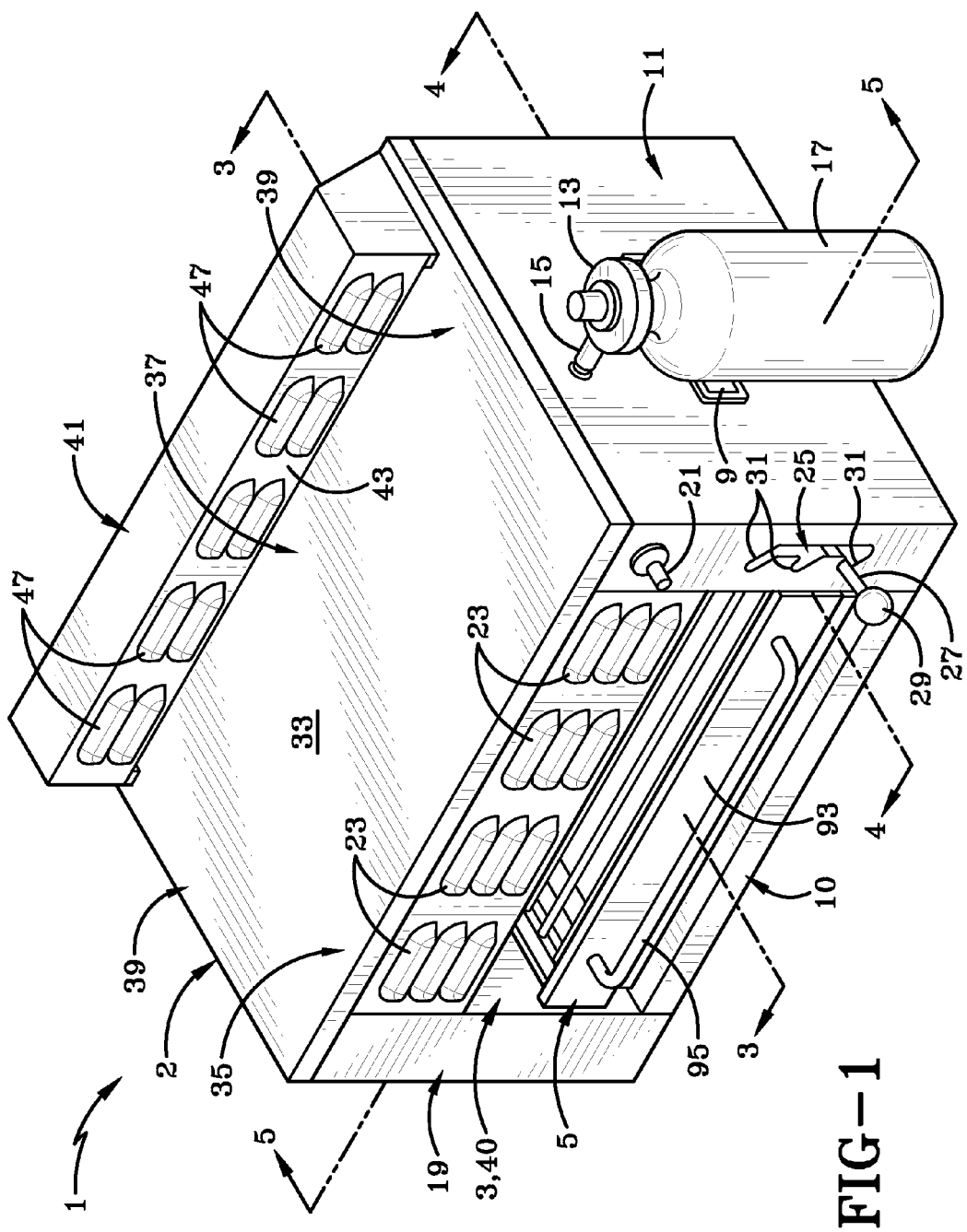
FIG. 1 is a perspective view of an embodiment of the infrared portable broiler of the present invention.
Figure 2:
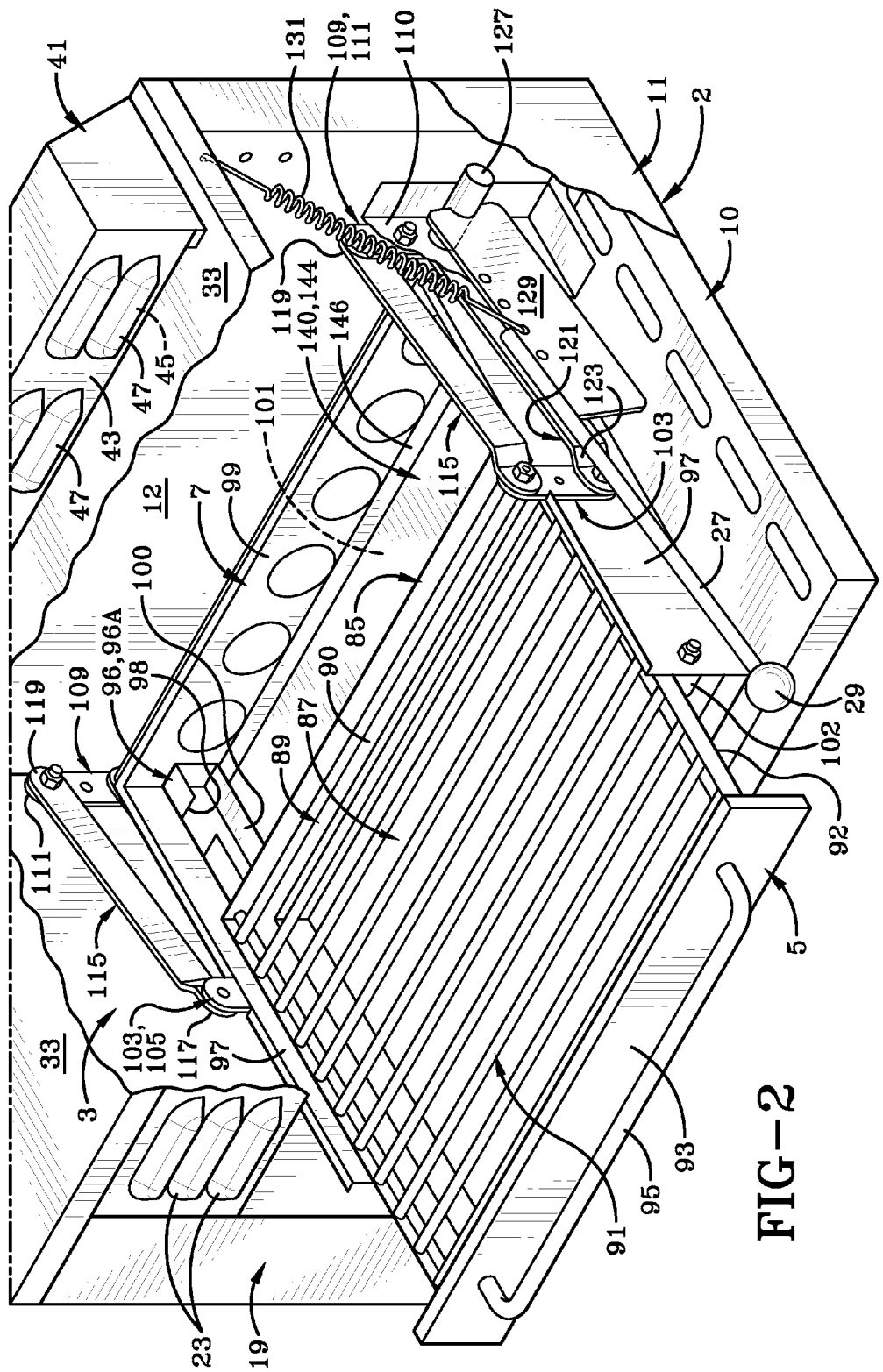
FIG. 2 is a view similar to FIG. 1 with portions cut away to view the internal cooking chamber of an embodiment of the present invention.

The infrared portable broiler of the present invention is shown in FIGS. 1-9 and is indicated generally at 1. As shown in FIGS. 1 and 2, infrared portable broiler 1 includes a main body or housing 2 which is generally box shaped and defines a cooking chamber 3 therein. Cooking chamber 3 is sized to receive a drawer assembly 5 which is slidably engaged with a drawer receiving assembly 7 (FIG. 2). Cooking chamber 3 is generally defined by a bottom wall 10, a back wall 12, a pair of sidewalls 11, and a plate 71 having various features described in detail below.

When viewed from the exterior, infrared portable broiler 1 includes a pair of handles 9 extending into corresponding sidewalls 11. One sidewall 11 features a hose 15 extending therethrough to be received by a regulator 13. Regular 13 is typically connectable with a propane canister 17 for supplying propane or any other gaseous mixture through regulator 13 and into hose 15.

As shown in FIG. 1, infrared portable broiler 1 includes a front wall 19. Front wall 19 is shown in FIG. 1 made up of several end plates from subcomponents all abutting one another to form the overall general front wall 19. Front wall 19 defines an opening 40 to cooking chamber 3. Extending through and outwardly away from front wall 19 is a push button 21 and a series of vent flanges 23 proximate a corresponding series of vents (not shown) defined by front wall 19. An adjustment track 25 is also defined by front wall 19 and provides an opening for an adjustment rod 27 to extend therethrough. Adjustment rod 27 terminates in a knob 29 to be used as a handle for actuating rod 27. Track 25 includes at least one cam channel 31, shown in FIG. 3 as three cam channels 31 arranged in a vertically extending series.

Figure 3:
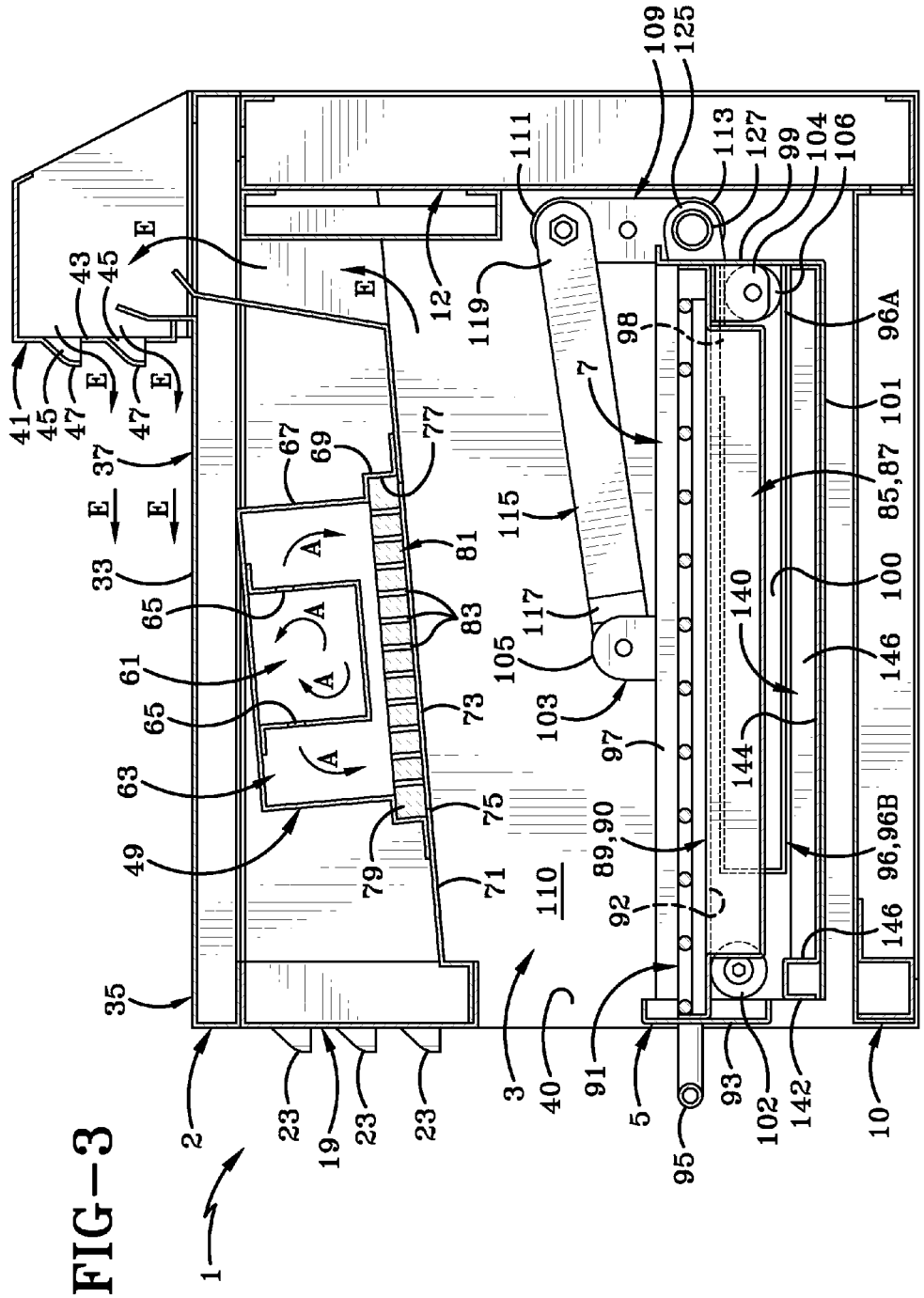
FIG. 3 is a side cross-sectional view taken on line 3-3 of FIG. 1.

As shown in FIGS. 1 and 3, a flat warming surface 33 is disposed directly above cooking chamber 3 and includes a general front area 35, opposite back area 37, and two spaced apart side areas 39. Extending upwardly and away from warming surface 33 and proximate back area 37 is a vented backstop 41. Backstop 41 includes a front wall 43 which defines a series of vents 45 (FIG. 3) therein and includes a corresponding series of vent flanges 47 extending outwardly away therefrom.

Figure 4:
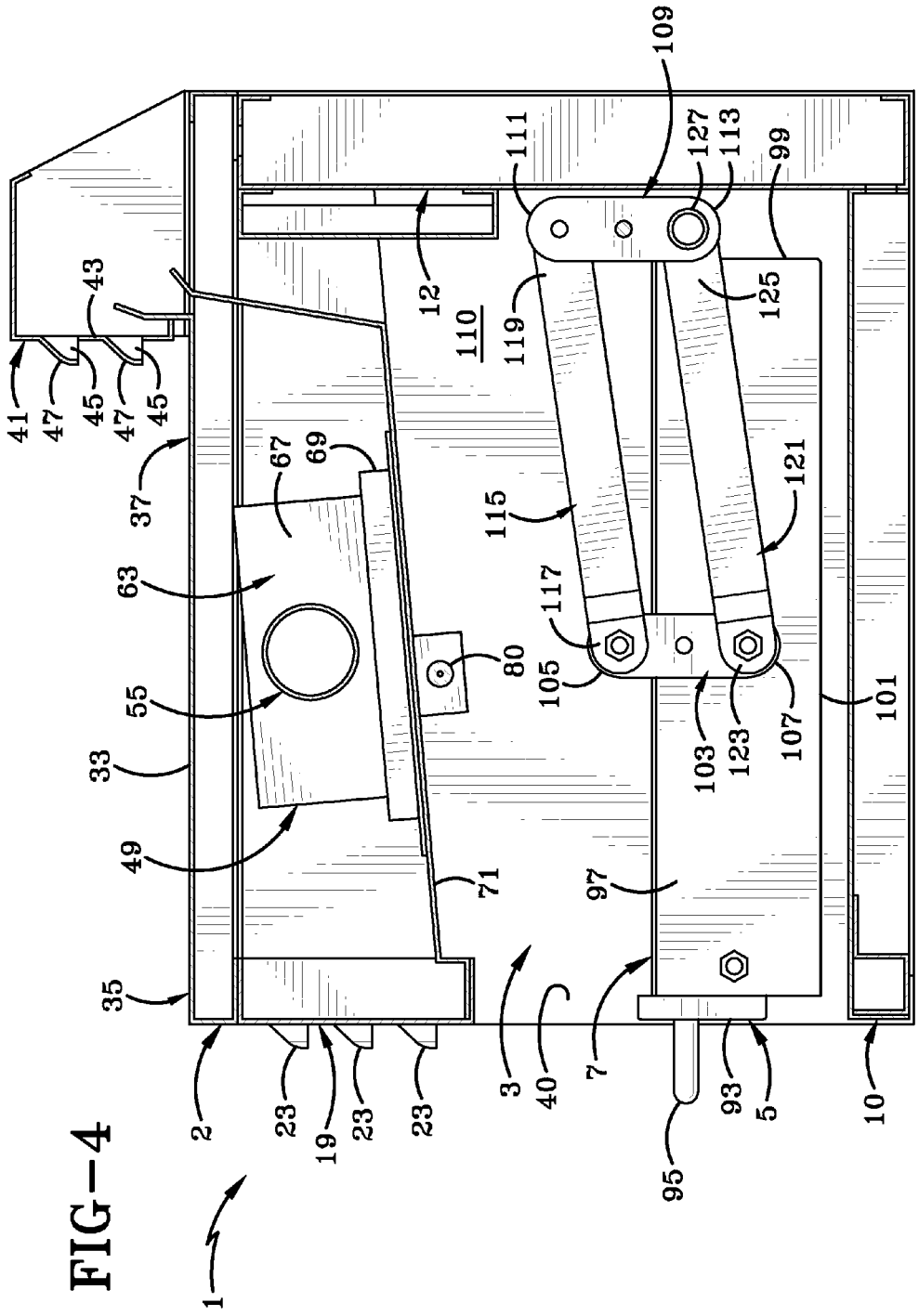
FIG. 4 is a side cross-sectional view taken on line 4-4 of FIG. 1.
Figure 6:
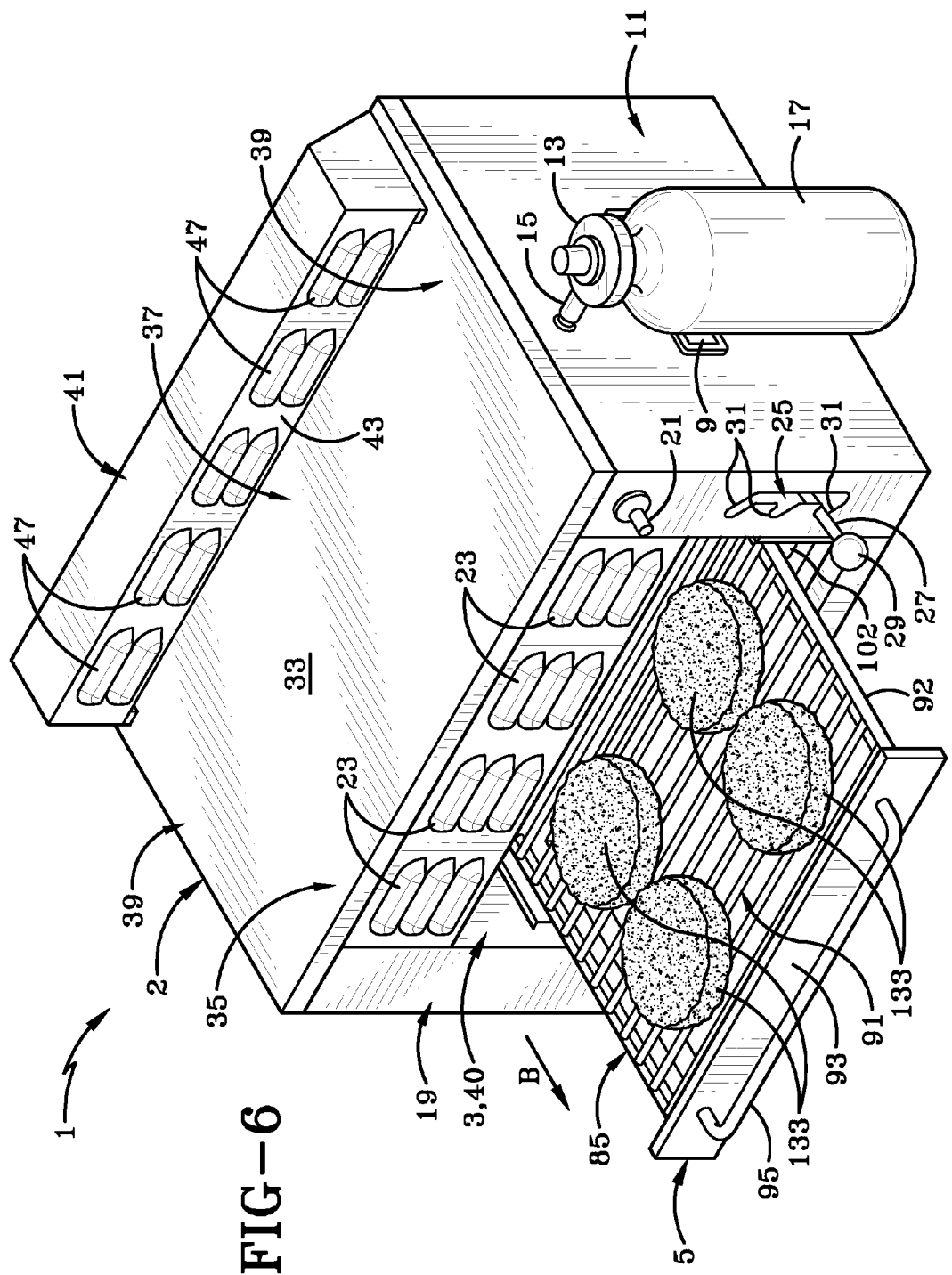
FIG. 6 is a perspective view similar to FIG. 1 showing the drawer assembly extended outwardly away from the cooking chamber.
Figure 7:
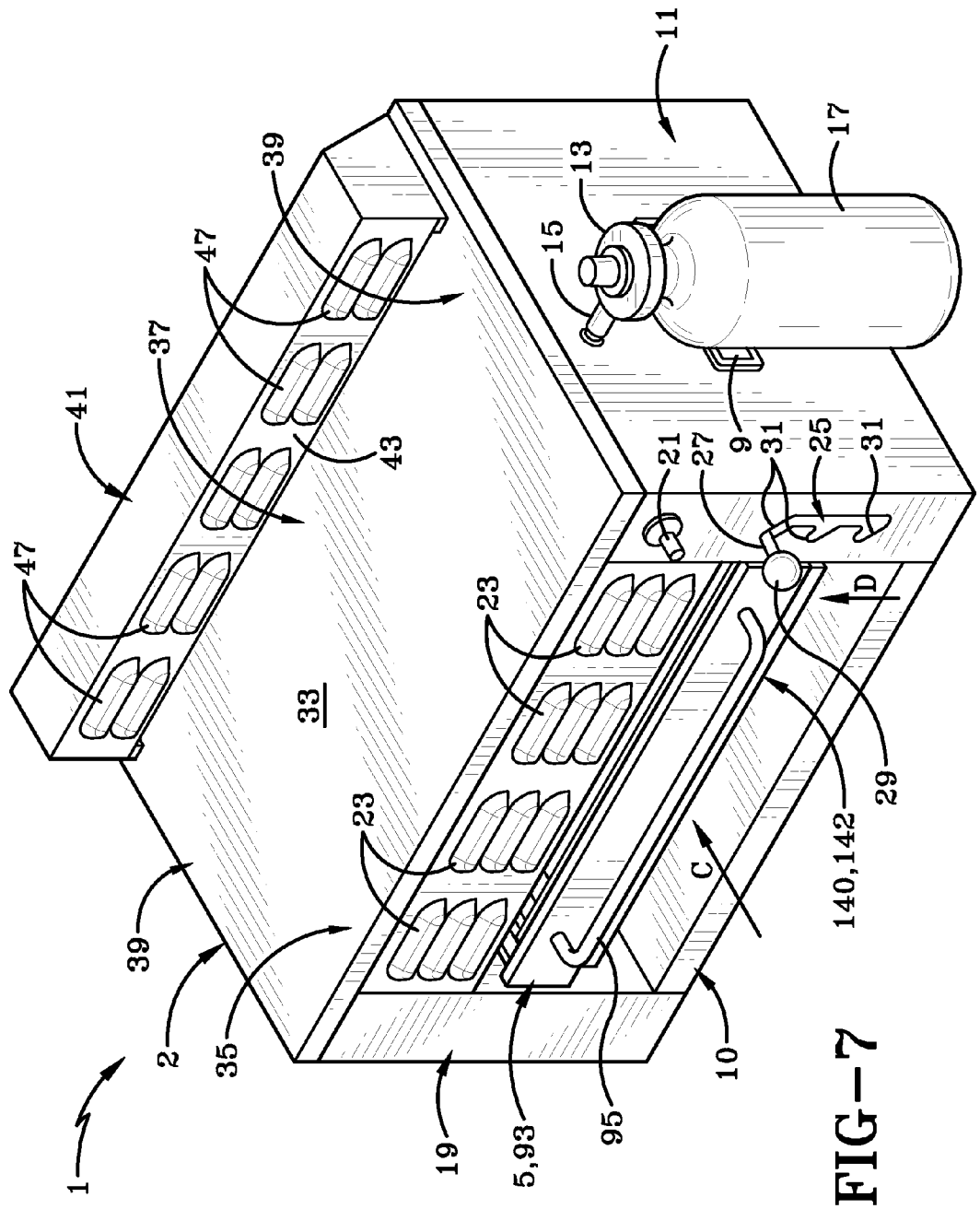
FIG. 7 is a view similar to FIG. 6 showing the drawer assembly retracted into the cooking chamber.
Figure 8:
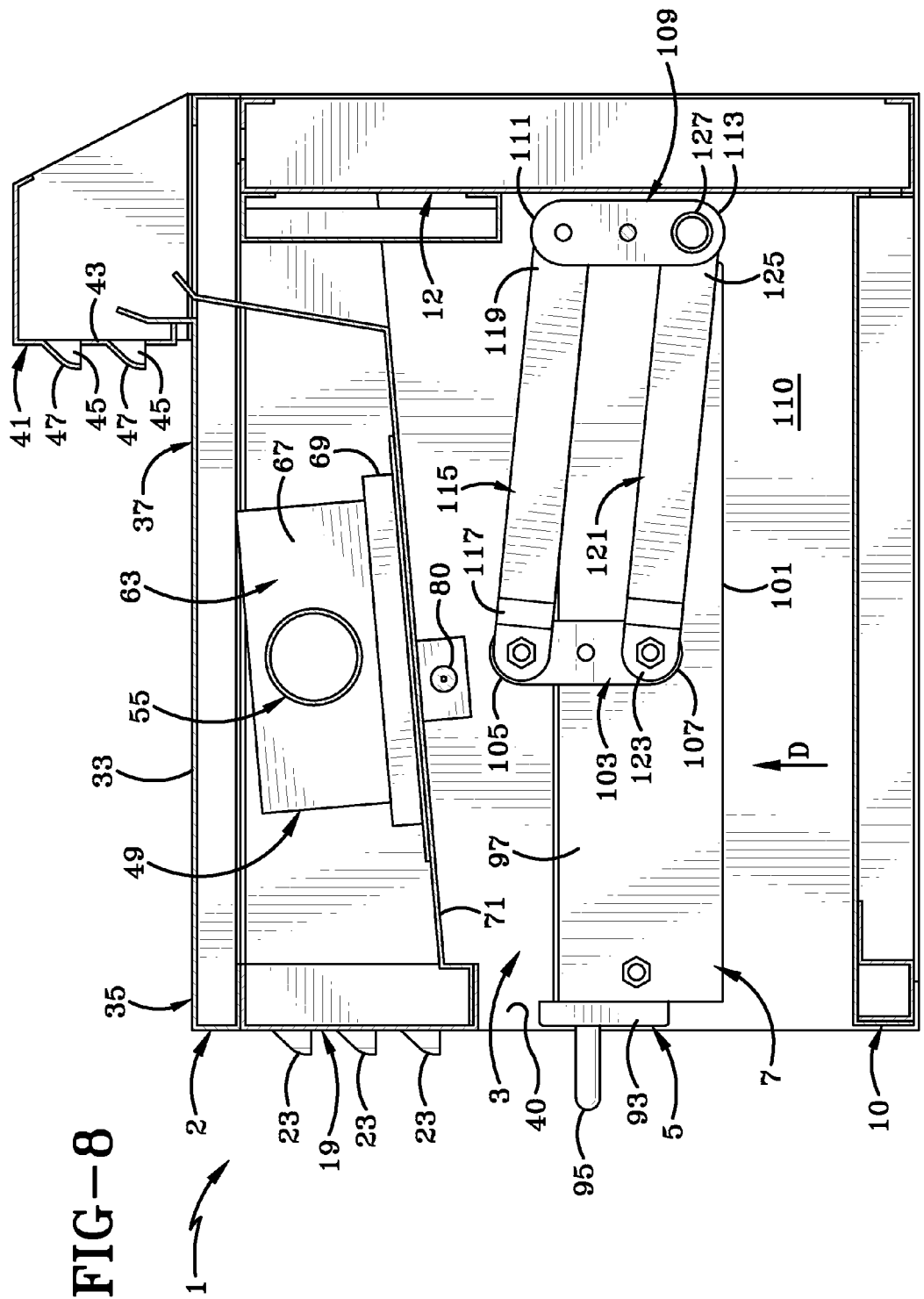
FIG. 8 is a side cross-sectional view taken generally along line 4-4 of FIG. 1 showing the drawer receiving assembly moving upwardly.

As shown in FIGS. 3, 4, and 6, infrared broiler includes a heating unit 49 disposed above cooking chamber 3. Heating unit 49 includes a bracket 51 or collar abutting the interior surface of side wall 11 and used to secure and hold hose 15 therein. Extending from bracket 51 is a nozzle 53 for expelling gas mixture into a tube 55 formed of metal in a general cylindrical shape. Tube 55 extends from a first end 57 proximate nozzle 53 to a second end 59. Second end 59 extends into a first chamber 61 which is contained within a second chamber 63. First chamber 61 is formed having a general rectangular cross-sectional shape as shown in FIG. 3, and defines several openings 65 therein. Second chamber 63 is sized to contain first chamber 61, as well as receive a portion of tube 55 therethrough.

Figure 5:
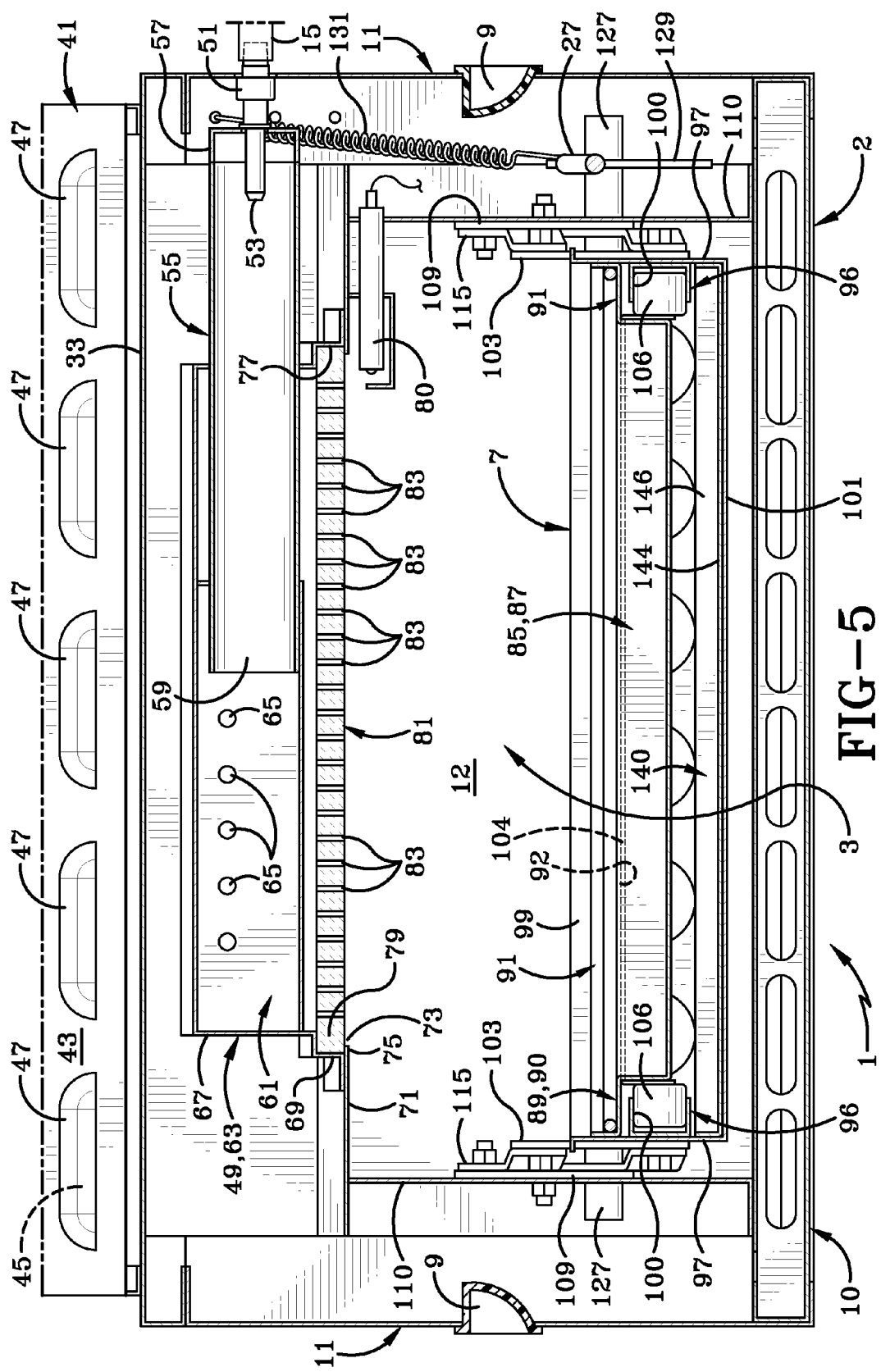
FIG. 5 is a front cross-sectional view taken on line 5-5 of FIG. 1.

As shown in FIGS. 3 and 5, second chamber 63 is formed by way of a bent or stamped wall 67, commonly formed of a metal material. Wall 67 defines a stepped recess 69 and is secured to a plate 71 which extends generally in the interior cooking chamber 3 from front wall 19 to a vented back stop 41, which will be discussed in more detail below. Plate 71 defines an opening 73 generally aligned with the overall shape of second chamber 63. Plate 71 provides a lip 75, whereby lip 75 generally surrounds opening 73. As shown in FIGS. 3 and 5, the sizing and placement of lip 75 in conjunction with stepped recess 69 forms a pocket 77 around the periphery of opening 73. Pocket 77 is sized to receive a peripheral edge 79 of a ceramic tile 81. Ceramic tile 81 may be formed in a single monolithic tile or several tiles combined to fit within pocket 77. Ceramic tile 81 defines several channels 83 extending entirely through ceramic tile 81 and generally from second chamber 63 to opening 73. A starter 80 is disposed proximate opening 73 within cooking chamber 3. Starter 80 is connected to push button 21 such that starter 80 ignites the gas when push button 21 is depressed.

As shown in FIGS. 2, 3, and 5, drawer assembly 5 includes a base plate 85 which is generally monolithic and folded or stamped into the desired shape. Base plate 85 includes a stepped region which defines a drip pan 87 and a ledge 89. Ledge 89 is formed to receive a removable gridiron 91 thereupon. More particularly, ledge 89 includes a top surface 90 and a bottom surface 92, whereby gridiron 91 rests upon top surface 90. A front plate 93 extends from base plate 85 and is formed in a generally elongated rectangular shape with a handle 95 extending outwardly away therefrom.

As shown in FIGS. 2-5, drawer assembly 5 is slidably and removably received within drawer receiving assembly 7. Drawer receiving assembly 7 includes two spaced apart side plates 97 connected by way of a back plate 99 and a bottom plate 101. Similar to a kitchen cabinet drawer, the drawer element of broiler 1 includes a set of rollers secured to the drawer receiver and a set of rollers secured to the drawer itself. Specifically, drawer assembly 5 includes a set of rollers 102 and drawer receiving assembly 7 includes a set of rollers 106. As shown in FIGS. 3 and 5, rollers 102 are rotatably secured to side plates 97 of drawer receiving assembly 7 while rollers 103 are rotatably secured to drawer assembly 5 by way of bracket 104. Rollers 102 and 103 provide a rolling surface for easily moving drawer assembly 5 in and out of cooking chamber 3 in a kitchen cabinet drawer style of movement. Rollers 102 rollably abut bottom surface 92 of ledge 89 (FIG. 3), while rollers 103 are rollably disposed in a channel 96 which defines a roller void 100. Roller void 100 receives rollers 103 therein and allows rollers 103 to move therein from a back area 96A of channel 96 to a front area 96A of channel 96. When a user wishes to remove drawer assembly 5 completely from housing 2, the user manually lifts drawer assembly 5 such that rollers 103 slide out of channel 96 by way of a notch 98 defined therein (FIG. 2). Thus, drawer assembly 5 becomes free of channel 96 and thereafter may be removed from housing 2 for cleaning, repair, etc.

Figure 9:
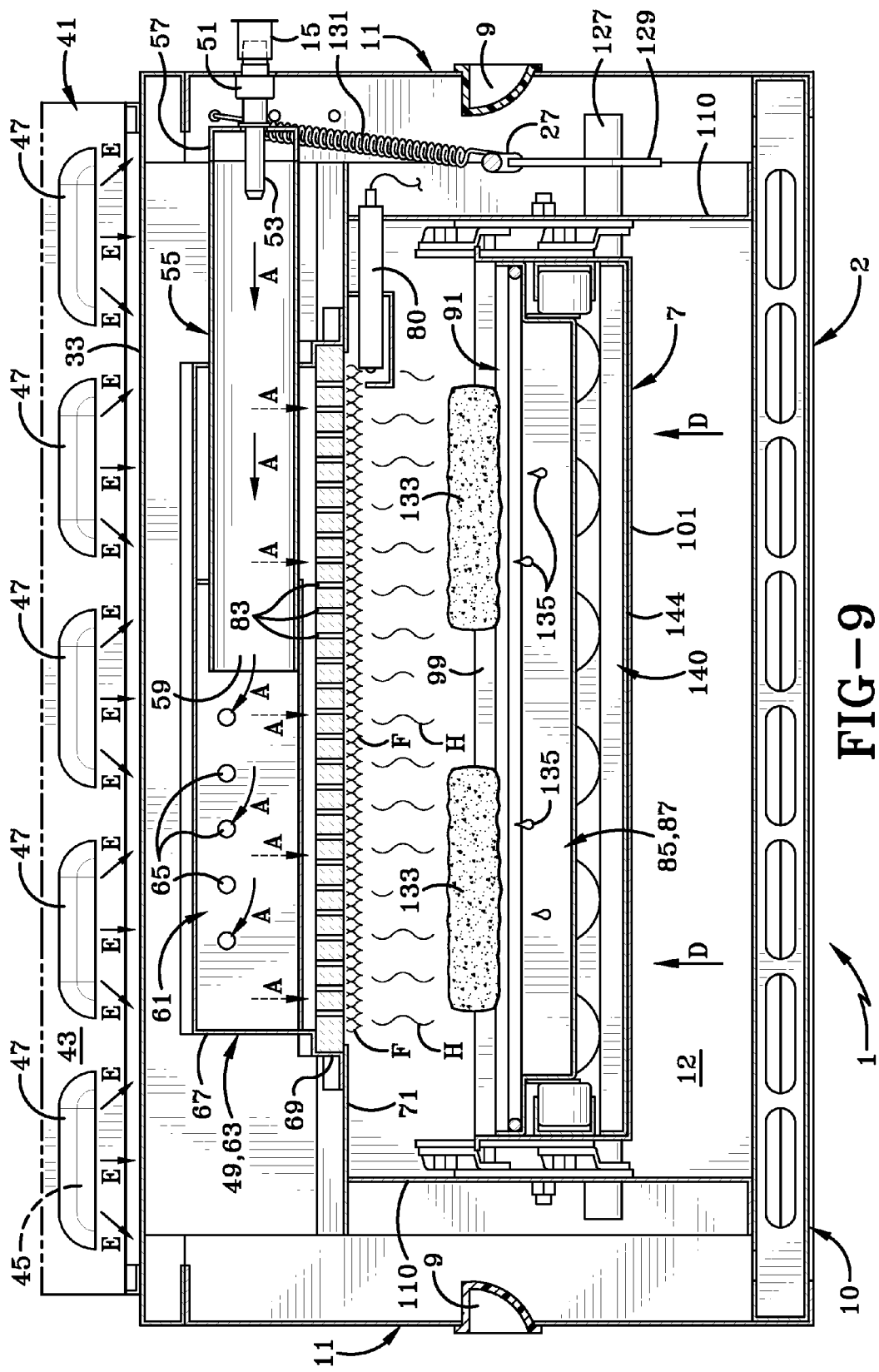
FIG. 9 is a view similar to FIG. 5 taken on line 5-5 of FIG. 1 showing the drawer receiving assembly moving upwardly.

As shown in FIGS. 2-5, drawer receiving assembly 7 may be vertically adjusted, which in turn adjusts the vertical positioning of drawer assembly 5. To that end, each side plate 97 receives a bracket 103 secured thereto having a first end 105 and a spaced apart second end 107. A similar pair of brackets 109 are secured to a corresponding pair of brace walls 110 disposed in cooking chamber 3 (FIG. 9). Each bracket 109 includes a first end 111 and a spaced apart second end 113. An upper arm 115 extends between each pair of brackets 103 and 109. Specifically, for each upper arm 115, a first end 117 is rotatably secured to first end 105 of bracket 103, while a second end 119 is rotatably secured to first end 111 of bracket 109. Similarly, a lower arm 121 extends between each pair of brackets 103 and 109. However, while a first end 123 of lower arm 121 is rotatably secured to second end 107 of bracket 103, a second end 125 of lower arm 121 is not secured to second end 113 of bracket 109. Second end 125 of lower arm 121 is instead secured to a pivot rod 127 by way of a weld or other peripheral secure connection such that lower arm 121 rotates with pivot rod 127 as pivot rod 127 rotates. Pivot rod 127 extends through second end 113 of bracket 109 and through each brace wall 110 and rotates therein. As shown in FIG. 2, rod 27 is secured to a plate 129 which is in turn secured to pivot rod 127. A spring 131 is secured at one end to plate 129 and secured at the other end to back wall 12 by one of a series of openings defined therein. Spring 131 provides an upward bias on plate 129 and in turn on pivot rod 127. Further, by way of upper arms 115 and lower arm 121, spring 131 provides and upward bias on the entire drawer receiving assembly 7.

As shown in FIGS. 3 and 9, infrared broiler 1 also includes a second drip pan 140. Drip pan 140 includes a front wall 142, a bottom wall 144, and a surround wall 146 defining the interior cavity used to contain drippings. Drip pan 140 is manually removable by way of a user simply pulling on drip pan 140 to extend it outwardly away from housing 2 for cleaning, repair, etc. Drip pan 140 is convenient for catching and containing any drippings or spatter which is expelled from the cooking items while the user has drawer assembly 5 in the opening position (FIG. 6). The primary drip pan 87 necessarily moves with drawer assembly 5 as it is manually pulled out of cooking chamber 3. Thus, drip pan 140 remains to catch any material or grease which may be expelled into cooking chamber 3.

As shown in FIGS. 1 and 3, infrared broiler 1 includes warming surface 33. Warming surface 33 is a flat elongated surface sized for receiving pans, bowls or other items thereupon. At the outset, one familiar with the art will readily understand space is typically limited in the environment for which infrared broiler 1 is intended. A tailgating environment, camping environment, or other such outdoor activities, typically have limited surface or counter space for which to place items. Particularly, items which are hot or warm are difficult to safely set aside in such an environment. Further, during a camping or tailgating event, there are numerous items for which it would be beneficial to keep warm during the activities. For example, it is highly desirable to keep a pan of baked beans warm during an event so that any individual may quickly add this food to their plate and be able to consume it in a warm state. As such, warming surface 33 is warmed by radiant heat from cooking chamber 3 with an infrared broiler 1.

As shown in FIGS. 3 and 9, and in particular Arrows A, first chamber 61 and second chamber 63 receive the propane/air mixture and agitate it therein. Thereafter the propane/air mixture moves towards and through channels 83 in ceramic tiles 81 and is ignited by way of starter 80. Heat generated from the flames F of the ignited propane/air mixture is initially expelled downwardly towards drawer assembly 5, as shown as heat lines H. It is commonly understood that heat rises and therefore by positioning warming surface 33 directly vertically above the primary heat source within infrared broiler 1, this heat may be recaptured and reused to heat warming surface 33.

As shown in FIGS. 1 and 3, infrared broiler 1 includes vented back stop 41 extending generally orthogonally outwards from warming surface 33. As shown by way of Arrows E, vented back stop 41 is in fluid communication with cooking chamber 3 and purposely vents heated air from within cooking chamber 3 through vents 45 generally towards warming surface 33. This may be understood to be a path from heating unit 49 to back stop 41, as illustrated by Arrows E. The path is partially defined by plate 71 which is angled with respect to warming surface 33 and abutting ceramic tiles 81. As shown particularly in FIG. 3, plate 71 is angled such that the heat produced through ceramic tile 81 is directed slightly towards the interior of cooking chamber 3. This recycles the heat and allows it to efficiently remain within cooking chamber 3 longer and eventually be expelled generally through vents 45 and absorbed into warming surface 33. Thus, warming surface 33 is kept warm by two separate and efficient methods, the first being the heat from cooking chamber 3 radiating directly upwardly towards warming surface 33, the second being the heated air from cooking chamber 3 moving in the direction of Arrows E and outwardly from vents 45 towards warming surface 33.

Vented back stop 41 also provides a safety feature for items placed on warming surface 33 in that these heated plates or bowls of food are not easily able to fall off the backside of infrared broiler 1. Vented back stop 41 also provides a barrier for children or other individuals from reaching warming surface 33 from behind infrared broiler 1. Thus, not only does warming surface 33 provide a convenient area for placing foodstuffs, warming surface 33 also provides radiant heat to these items to keep these items warm. Further, by combining warming surface 33 with vented back stop 41, warming surface 33 remains safe from unwanted access from behind infrared broiler 1, as well as unwanted spillage of food off of the back of warming surface 33.

Another feature of the present invention relates to the orientation of back stop 41 with respect to cooking chamber 3. As shown in FIG. 4, infrared broiler 1 in general, and front wall 19 in particular, defines opening 40 as a passageway into cooking chamber 3. Opening 40 is oriented such that opening 40 is proximate front area 35 while back stop 41 is proximate back area 37. This orientation of opening 40 with respect to back stop 41 allows a user to operate infrared broiler 1 by standing directly in front of opening 40. This further blocks children or other users and prevents potential harm done via the heat of infrared broiler 1 from this side. A user may position broiler 1 such that only the back portion is accessible by others. As such, back stop 41 is disposed proximate back area 37 to further restrict access to the heat of broiler 1 and to form an extended wall-like structure directly facing those who may be at risk. This eliminates the possibility of a child or unfocused adult from being burned by infrared broiler 1.

In operation, a user transports infrared broiler 1 to a desired location such as a sporting event or a camp ground via an automobile or other similar transportation mechanism. The user then connects a small portable propane canister such as canister 17 to regulator 13. The user ignites the propane and starts heating unit 49 in the typical manner commonly used in the prior art, namely, by pushing or depressing push button 21, which in turn creates a spark via starter 80 within cooking chamber 3. This spark ignites the gas seeping through ceramic tile 81 from first chamber 61 and second chamber 63. The gas is received within first chamber 61 and 63 via nozzle 53, hose 15, and regulator 13 from the primary source of propane canister 17. Air from the exterior of housing 2 is also pulled into tube 55 via second first end 57, which is partially open for this purpose.

While igniting gas within a cooking unit by way of the previously described method is well known in the prior art, broiling food via an infrared burner in a portable unit is not known in the prior art, particular via a propane source. For some background, infrared heating of food items works by igniting a gaseous fuel to super heat a ceramic tile, causing it to emit infrared radiation by which the food is cooked. The thermal radiation is generated when heat from the movement of charged particles within atoms is converted to the electromagnetic radiation in the infrared heat frequency range. The benefits are that the heat is uniformly distributed across the cooking surface and that temperatures reach over 900° Fahrenheit, allowing users to sear items quickly. Infrared cooking differs from other forms of grilling, which use hot air to cook the food. Instead of heating the air, infrared radiation heats the food directly. The benefits of this are a reduction in preheat time and less drying of the food. Grilling enthusiasts claim that food cooked on an infrared system tastes similar to food from chargrills. Enthusiasts also say that food cooked using infrared methods seem juicier. Also, infrared heating has the advantages of instant ignition, better heat control, and a uniform heat source.

The infrared heating benefits and methods described above are shown in FIGS. 3 and 9. With respect to FIG. 3, Arrows A show the movement of gas/air mixture within first chamber 61 and second chamber 63. With respect to FIG. 9, Arrows A are shown to reflect the movement of gas/air mixture in the direction of ceramic the 81. As gas/air mixture enters tube 55 via nozzle 53, it travels in the directions of Arrows A. As the mixture travels through channels 83 in ceramic tiles 81, starter 80 and previously ignited gas ensure that the mixture ignites to form flames F and heat H as it travels through channels 83. Ceramic tile 81 is thereby superheated causing it to emit infrared radiation by which the food is cooked. This provides a very high temperature within cooking chamber 3 directed downwardly towards any food disposed on gridiron 91. Further, temperatures can be greater than 900° Fahrenheit within cooking chamber 3. These features represent an enormous improvement over typical portable grills. For example, as shown in FIG. 9, several hamburger patties 131 are shown disposed on gridiron 91. These hamburger patties 133 are receiving a tremendous amount of even and uniformly distributed infrared heat via ceramic tile 81 disposed directly above. Drip pan 87 is disposed directly below hamburger patties 133 oriented to receive any drippings 135 emitted from hamburger patties 133. Note that drippings 135 are travelling away from ceramic tile 81 during the natural cooking process. This allows ceramic tile 81 to remain free of any grease or other debris emitted by the food being cooked. This ensures ceramic tile 81 remains clean and extends the life of ceramic tile 81. This orientation of ceramic tile, hamburger patties 133, and drip pan 87 also ensures no additional flame, scorching, or jumping is generated by drippings 135, as is commonly seen in the prior art. Without scorching flames jumping towards the food, the food is cooked more evenly and without unwanted burning or charring.

As shown in FIGS. 1, 2, 4, and 8, a user may adjust the overall height of drawer assembly 5 and drawer receiving assembly 7 within cooking chamber 3. As shown in FIG. 1, knob 29 extends outwardly away from front wall 19 and is readily accessible by the user. As discussed previously, rod 27 connected to knob 29 is biased upwardly by way of spring 131. This allows the user to manually move knob 29 out of a particular cam channel 131 within track 25 and into another cam channel 31 which reflects a different vertical height within cooking chamber 3. As shown in FIG. 4, drawer receiving assembly 7 is set on the lowest height within cooking chamber 3. Contrast to FIG. 4 to FIG. 8, whereby drawer receiving assembly 7 has been repositioned by the user into the topmost or highest vertical height within cooking chamber 3. While bracket 109 and the associated mechanical linkages thereon remain generally stationary within cooking chamber 3, bracket 103 moves along with drawer receiving assembly 7. To add stability and leverage, upper arm 115 and lower arm 121 mechanically link bracket 109 and bracket 103. As a user manually manipulates rod 27, plate 129 moves pivot rod 127 which in turn moves lower arm 121. Lower arm 121 is connected to bracket 103 generally about the midpoint of side plates 97. This allows movement of drawer receiving assembly 77 vertically upwardly or downwardly while the overall orientation of drawer assembly 5 remains generally horizontal. One would readily understand that any movement of drawer receiving assembly 77 proximate the front or back of side plates 97 would tip or tilt drawer assembly 5 within drawer receiving assembly 7 in a non-horizontal manner. Thus, the present invention allows the user to actuate and move the food disposed on gridiron 91 vertically within cooking chamber 3 while maintaining a horizontal orientation for the food.

As discussed previously, infrared broiler 1 includes opening 40 disposed in front wall 19, which provides an opening to cooking chamber 3. Opening 40 provides a method for the user to cook and view food without releasing the heat inside cooking chamber 3. As such, cooking chamber 3 is free of a lid and is not exposed to the exterior of broiler 1 except by way of opening 40. Prior art portable grills typically contain an open flame, which requires significant constant fuel to maintain a high temperature. Similarly, other prior art portable grills may contain a lid over the flame. However, when a user opens the lid to check on the food items, all of the heat which has built up inside the grill is thereby released. This swing in temperature from built up heat to released heat prevents a steady heating of the food inside. Conversely, infrared broiler 1 incorporates a new paradigm in portable cooking via opening 40. Opening 40 is oriented such that the heat is constant within cooking chamber 3, is not exposed to the elements, and does not lose heat when a user checks the food. The improved heat control of infrared broiler 1 provides a steady heat source to the food with the benefit of cooking the food more evenly.

Another feature of infrared broiler 1 which works in conjunction with opening 40 is the overall angled nature of plate 71. This can best be seen in FIG. 3, where plate 71 is non-horizontal within cooking chamber 3. The angled nature of plate 71 allows heat from first chamber 61 and second chamber 63 to recirculate from the front to the back of the cooking chamber and generally away from opening 40. This further works to maintain the constant and improved heat control of infrared broiler 1 as heated air is constantly flowing away from opening 40.

While infrared heating is shown and described herein as an exemplary embodiment of the present invention, all of the concepts and features are contemplated for use with an electric style broiling system. This system would necessarily include an electrical power input, for example by way of a power cord connectable with an outlet. Rather than ceramic tiles, the electric current is transferred through a resistance coil which heats to a desired temperature and emits heat. Radiant heat from the resistance coil warms warming surface 33 in the same fashion as the infrared system described above.

In summary, in one aspect, the invention may provide a device similar to portable broiler 1, which may include housing 2, cooking chamber 3 defined by housing 2, a grilling surface which may be in the form of grid iron 91 disposed in cooking chamber 3, and heating unit 49 disposed above grid iron 91 and selectively operable in one of a broiling state and a non-broiling state, whereby heating unit 49 heats grid iron 91 when heating unit 49 is in the broiling state. Portable broiler 1 may also include ceramic tiles 81 disposed in cooking chamber 3, wherein ceramic tiles 81 are heated in the broiling state. Still further, portable broiler 1 may include warming surface 33 disposed above heating unit 49, whereby heating unit 49 heats warming surface 33 when heating unit 49 is in the broiling state. Portable broiler 1 may include back stop 41 proximate warming surface 33 and may include plurality of vents 45 defined by back stop 41. As shown in FIG. 3 via Arrows E, vents 45 may be in fluid communication with cooking chamber 3 and may be oriented to vent fluid toward warming surface 33. Portable broiler 1 is adapted to rest on a base surface (not shown) which preferably orients warming surface 33 generally parallel to the base surface. Portable broiler 1 may include plate 71 (FIG. 3) which is disposed in cooking chamber 3. Plate 71 may be non-parallel with warming surface 33. This aids in venting the heated air from cooking chamber 3 towards back stop 41, as shown by Arrows E in FIG. 3. Vented back stop 41 may extend orthogonally from warming surface 33, as shown in FIGS. 1 and 3. While any fuel or power source is encompassed by the present invention, preferably broiler 1 is formed to receive portable propane canister 17, as shown in FIG. 1.

In another aspect, the invention may provide a device similar to portable broiler 1, which may include housing 2, warming surface 33 disposed on housing 2, a grilling surface which may be in the form of grid iron 91 removably disposed in housing 2, and heating unit 49 disposed in housing 2 and operable to simultaneously heat grid iron 91 and warming surface 33, whereby heating unit 49 is disposed between warming surface 33 and grid iron 91. Broiler 1 may further include back stop 41 extending from warming surface 33. As shown in FIG. 3 by way of Arrows E, broiler 1 may include plurality of vents 45 which are in fluid communication with grid iron 91. Broiler 1 may include ceramic tiles 81 disposed in heating unit 49 and plate 71 disposed in housing 2 and adjacent to ceramic tiles 81 (FIG. 3), whereby plate 71 is non-parallel with warming surface 33. Portable broiler 1 may also include drawer assembly 5 removably disposed in housing 2, drip pan 87 removably disposed in drawer assembly 5, and drip pan 140 removably disposed in housing 2.

In another aspect, the invention may provide a method for cooking an item of food on a grilling surface such as grid iron 91. The method may include the steps of: positioning heating unit 49 above grid iron 91, positioning warming surface 33 above heating unit 49, directing an amount of heat downwardly from heating unit 49 towards grid iron 91, and heating warming surface 33 from below via radiant heat from the amount of heat. The method discussed above may also include the step of venting radiant heat from the amount of heat through back stop 41 and onto warming surface 33. The method may also include the step of forming a path from heating unit 49 to back stop 41, whereby the path is partially defined by plate 71 which abuts ceramic tiles 81. This path is illustrated by way of Arrows E in FIG. 3. The method discussed above may further include the step of biasing grid iron 91 toward heating unit 49, as shown in FIG. 5 by way of spring 131. Finally, the method may also include the step of connecting portable propane canister 17 to heating unit 49 provide fuel for heating unit 49.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and illustrative examples shown and described. Thus, this application is intended to embrace alterations, modifications, and variations that fall within the scope of the appended claims.

Moreover, the description and illustration of the invention is an example and the invention is not limited to the exact details shown or described. References to "the preferred embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in the preferred embodiment" does not necessarily refer to the same embodiment, though it may.

The invention claimed is:

1. A method for cooking an item of food on a grilling surface, the method comprising the steps of:
    positioning a heating unit above the grilling surface;
    positioning a warming surface above the heating unit;
    directing an amount of heat downwardly from the heating unit towards the grilling surface;
    heating the warming surface from below via radiant heat from the amount of heat;
    venting radiant heat from the amount of heat through a vented back stop and onto the warming surface; and
    forming a path from the heating unit to the vented back stop, whereby the path is partially defined by an angled plate which abuts a ceramic tile.

2. The method of claim 1, further comprising the step of biasing the grilling surface towards the heating unit.

3. The method of claim 2, further comprising the step of connecting a portable propane canister to the heating unit to provide fuel for the heating unit.

* * * * *